LIGHTWEIGHT PRESTRESSED STRUCTURAL CONCRETE MEMBER AND METHOD FOR MANUFACTURING THE SAME

Original Filed Jan. 5, 1968 2 Sheets-Sheet 1

United States Patent Office

Re. 27,785
Reissued Oct. 16, 1973

27,785

LIGHTWEIGHT PRESTRESSED STRUCTURAL CONCRETE MEMBER AND METHOD FOR MANUFACTURING THE SAME

Hideya Kobayashi, 14–14, 1-chome Nagaski, Toshima-ku, Tokyo, Japan

Original No. 3,501,882, dated Mar. 24, 1970, Ser. No. 695,967, Jan. 5, 1968. Application for reissue May 21, 1971, Ser. No. 142,789
Claims priority, application Japan, Jan. 12, 1967, 42/1,952; May 9, 1967, 42/28,886
Int. Cl. E04b *2/10*; E04c *3/10, 3/22*
U.S. Cl. 52—228 5 Claims

Matter enclosed in heavy brackets [ ] appears in the original patent but forms no part of this reissue specification; matter printed in italics indicates the additions made by reissue.

ABSTRACT OF THE DISCLOSURE

A lightweight prestressed structural concrete member comprising a plurality of precast rectangular concrete blocks arranged in side-by-side relation, each of said blocks having at least one elongated recess along at least one of its peripheral edges so as to form an elongated gap between two adjacent blocks, said gap being filled with concrete material after stretching within said gap at least one wire of high tensile strength with a predetermined tension, whereby the blocks and the concrete material filling said gap are subjected to pre-compression.

BACKGROUND OF THE INVENTION

The present invention relates to a lightweight concrete member of a predetermined thickness for use as a beam or a slab for wall and/or floor construction of a building, and more particularly to a lightweight concrete member of such a type that is constituted by a plurality of rectangular concrete blocks.

Hithertofore, in the art of manufacturing prestressed concrete members, two different types of method have been known. These methods include the "pretension" method and the "post-tension" method. According to the known "pretension" method, a concrete panel is moulded in a mould comprising a rectangular framework having a plurality of tension wires stretched under a predetermined tension between the opposed side members of said framework. As soon as the concrete panel is cured the framework is removed from the panel leaving the tension wires therein. Thus, the wires serve to give a predetermined compression to the panel. By this method, a satisfactory prestressed concrete member can be obtained, however, this is disadvantageous in that an additional expense is required in providing the mould and that the mould cannot be removed until the panel is sufficiently cured.

The post-tension method is currently employed to an integrally moulded concrete member and it is not applicable to such a member that is constituted by a plurality of concrete blocks.

SUMMARY OF THE INVENTION

The present invention is directed to a novel prestressed concrete member and the method for manufacturing the same which is free from the above described disadvantages of the prior methods. It may be expressed that the present invention resides in its nature between the pre-tension and the post-tension methods.

According to the present invention, a lightweight prestressed structural concrete member is provided, which member comprises a plurality of precast rectangular concrete blocks arranged in side-by-side relation, an elongated gap being formed between each of two adjacent blocks along the edges thereof, said gap being filled with concrete material, and means disposed in said gap for subjecting the blocks and the concrete material in said gap to a predetermined pre-compression.

Further, according to the present invention, a method is provided for manufacturing the above described concrete member.

In order that the present invention may be more clearly understood and readily carried into effect, reference may now be had to the accompanying drawings in which several forms of the present invention are illustrated by way of example, and in which.

Figure 1:
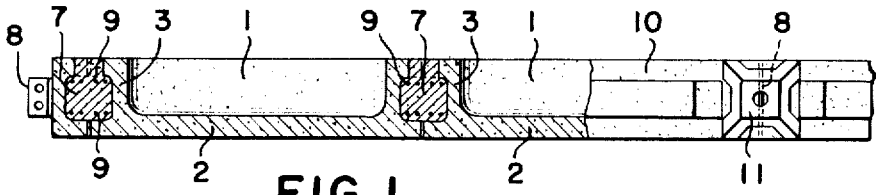
FIG. 1 is a partially broken side view of a structural slab embodying the present invention.
Figure 2:
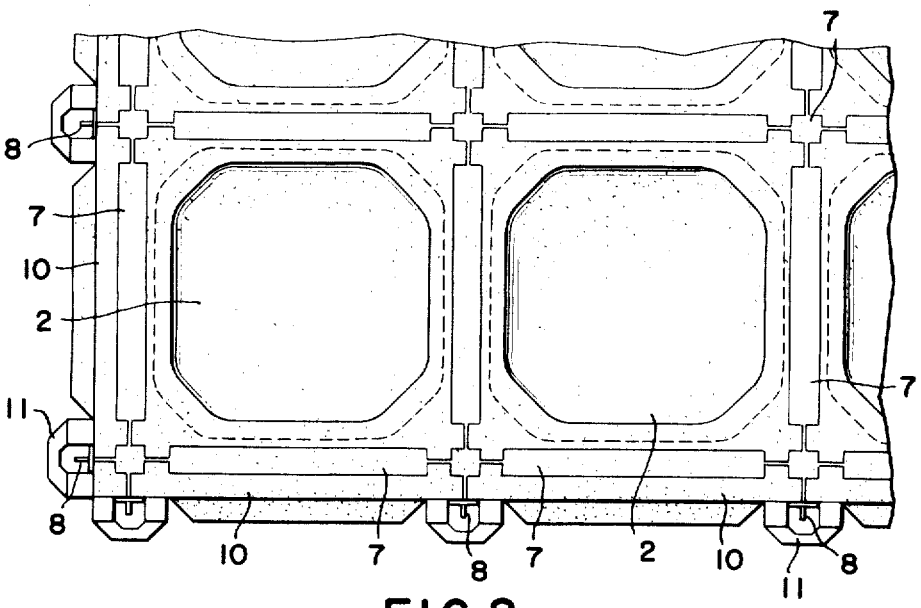
FIG. 2 is a plan view of the structural slab shown in FIG. 1.

As above mentioned, generally the recessed blocks are rectangular, but they may also be square, and the drawing illustrates blocks of said square shape.

Figure 6:
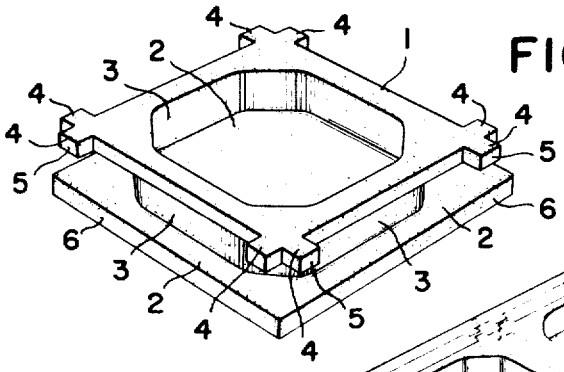
FIGS. 6 and 7 are perspective views of a single precast block and a member constituted by nine of such blocks respectively.

Referring now to the drawings, particularly to FIG. 6, the square block 1 has a recess 2 in one of its surfaces side and the back side of the recessed portion is a plain flat surface.

The thin portion of the block at the back of the recess is extended outwardly from the sides of the square frames 3 of the blocks, and the periphery 6 of the extended thin portion is also square and of a fixed dimension.

At the other periphery of the square frame 3, there are two projected portions 4 in every four corners as shown in drawings, and the outside surface 5 of each projection 4 lies in the same plane as a peripheral surface of the extended thin portion 6.

These precast concrete blocks 1 are reinforced with meshed wires or steel bars, and also may be made of lightweight concrete of low water-cement ratio by the aid of shaking apparatuses utilizing the instantly releasing forms.

Figure 7:
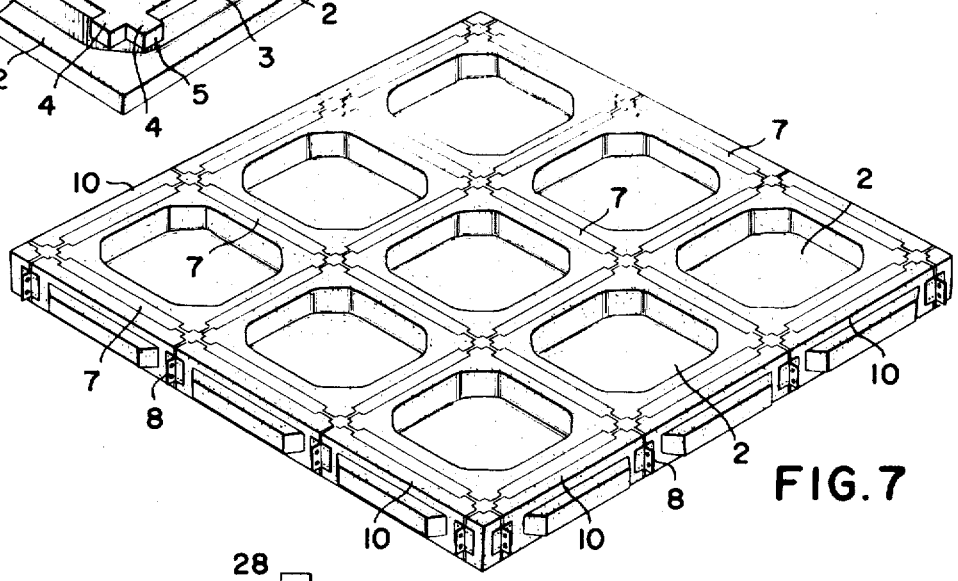

Such precast recessed blocks are assembled as shown in FIG. 7, with the outer surface 5 of the projections 4, and the peripheries 6 of the extended portions contacting each other precisely, there are obtained narrow gaps 7, which are distributed rectangularly in latticed form.

Several high tensile strength wires 9 of fixed length are stretched in each of gaps 7, and both ends of the wires 9 pass through holes in T shaped anchor plates 8, which are situated at each end of the gaps. Then enlarged heads are formed at both ends of the wires outside of the anchor plates by the aid of a heading machine utilizing high oil pressures.

Thus when the anchor plate 8 is drawn by jacks in outward direction, high tension is applied to wires 9 accordingly.

U shaped precast oblong blocks 10, each of which has the same length as one side of a recessed block 1, are arranged along the outer peripheries of the assembly as shown in the drawings, and supporters 11 and jacks are situated outside of these oblong blocks 10 at every end positions of the gaps 7.

Figure 3:
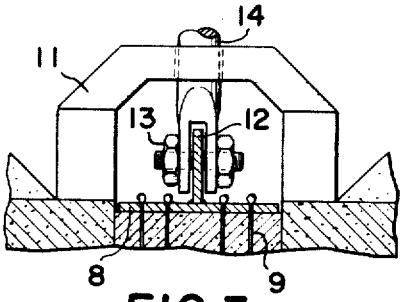
FIGS. 3, 4 and 5 show, in front, bottom and side views respectively, the manner in which tension force is applied to reinforcement wires in the slab.
Figure 4:
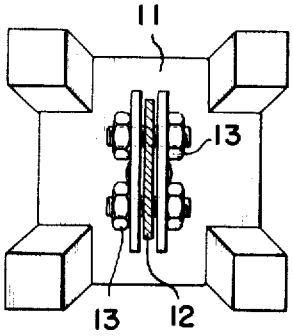
Figure 5:
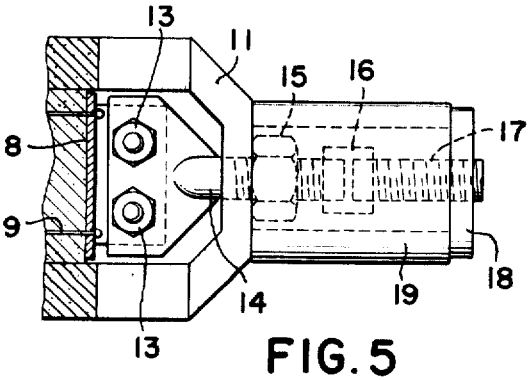

Steel bars 14 are attached to the flanges 12 of the T shaped anchor plates 8 with bolts and nuts 13, as shown in FIGS. 3, 4 and 5, and nuts 15 are installed to the other ends of the bars 14. A coupler 16 connects another steel bar 17 to each steel bar 14 as shown, and at the other end of the bar 17 an anchor plate 18 is attached, the two bars 14 and 17 passing through the center holes of ramchairs (not shown) and that of the center hole rams 19, which are fed with oil under pressure from pumps.

When the high oil pressure of the jack-pump is fed to the centerhole rams 19, the bars 14 and 17 are driven with strong forces in an outward direction, and high tension stress is applied to the wires 9.

At the time when the tension stress applied to the wires 9 is sufficient, the nuts 15 are screwed tightly through the outer windows of the ramchair (not shown in drawings), then the couplers 16 are unscrewed, and the centerhole rams 19 and the bars 17 are released from the supporter 11, and fresh concrete is poured into the gaps 7.

In this case the compressive forces which result from the tension applied to the wires 9, are resisted through the supporters 11, the oblong blocks 10, the thin portions 2 and the projections 4 of the recessed block 1 which are distributed in latticed style in two rectangular directions as shown in the drawings.

When the strength of the poured concrete becomes sufficient in compression to resist the prestress of the wires, over a lapse of days, the bars 14 and the supporters 11 are released from the blocks, and thus the constructive members of slabs for walls or floors are completed.

Figure 9:
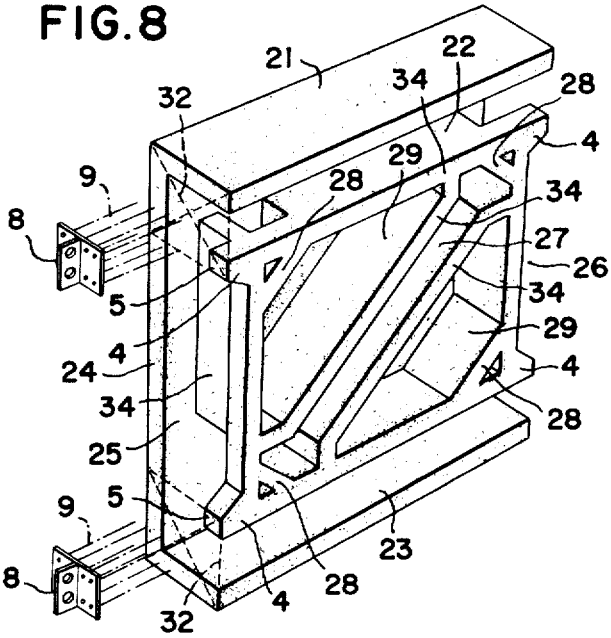
FIG. 9 is a perspective view of one block of said beam.

Referring now to FIG. 9 a precast rectangular block 21 for parallel cord beams is illustrated in perspective view, and in this case a diagonal gap 27 for strength purposes is installed at the center of the central recess.

In the upper and lower sides of the block, an upper cord gap 22 and a lower cord gap 23 extend through the entire width of the block in parallel relation as shown.

There are also thin portions 24 at the other side of the block, and thin guiding walls 34 project perpendicularly from the thin portion 24. At the right and left side of the block, vertical gaps 25 and 26 are formed, and triangle portions 28 are installed to strengthen the corners of the guiding walls 34.

The recess is divided by the diagonal gap 27 into two parts 29.

Figure 8:
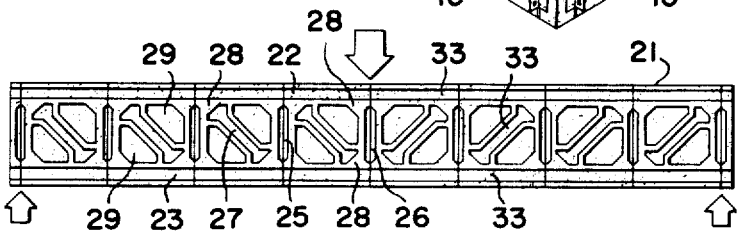
FIG. 8 is a side view of a parallel-cord trussed beam.

When such a precast block 21 is arranged in a line as shown in FIG. 8, many high tensile strength wires 30 are stretched in the upper gap 22, and also in lower gap 23, and at the ends of these wires 9 they are attached to the T shaped anchoring plates 8 in the same manner as above explained.

Then the compressive forces are resisted by the area indicated by the dotted line 32, when high tensile forces are applied to the high tension wires 9 by the aid of the jacks (not shown), which are attached to the flanges of T shaped anchor plates 8, also in the same manner as described above.

Some reinforcement of deformed bars are installed in the vertical gaps 25, 26, and diagonals 27, and fresh concrete 33 is poured in the gaps as shown in FIG. 8.

In such a manner, prestressed concrete beams with parallel cord trusses can be completed without any forms, and the cost of this fabrication is reduced remarkably.

Thus, lightweight structural concrete members, such as the parallel cord beams and slabs for walls and floors, can be fabricated very economically, and buildings constructed from these structural members can be erected with remarkably low cost, because the members require minimum quantities of concrete without using any forms, and yet they have very high structural efficiency.

The details of making such structural concrete members may be modified substantially without departing from the spirit of the present invention.

What is claimed is:

1. A structural assembly comprising a plurality of precast concrete blocks, each of said blocks having a pair of opposed surfaces and including a relatively thin peripheral flange extending outwardly along the entire periphery at one of said surfaces and defining a rectangular outline, said blocks being arranged so that the edges of adjacent flanges of two adjacent blocks abut each other whereby elongated recesses are formed between adjacent blocks, [at least one outwardly extending] projection [on] *means at* each side of [the] *each* block at the other of said surfaces of the *blocks* [block] *and extending between adjacent blocks for positioning such adjacent blocks such that* [, said projections having an edge surface which is in the same plane as the edge of said flange whereby] when assembled the [end] *edge* surfaces of two adjacent blocks abut each other, wire reinforcement means disposed within said recesses and means engageable with said wire reinforcement means to apply tension force thereto, the latter said means being positioned to apply resistive compression force to said *projection means* [projections] during the application of the tension force to said wires, said recesses being filled with concrete, *said projection means comprising at least one outwardly extending projection at each side of the block having an edge surface in the same plane as the edge of said flange.*

2. An assembly as claimed in claim 1 comprising anchors in each recess engaging the wire reinforcement means at the ends thereof, said means for applying the tension force to the wires being detachably engageable with said anchors.

3. An assembly as claimed in claim 1 wherein said recesses extend in two arrays, one array at right *angles* [angle] to the other.

4. An assembly as claimed in claim 1 wherein said means for applying tension force to the wire reinforcement means comprises a support member adapted to contact the assembly and engage the wire means so that when the latter is subjected to tension, the assembly is subjected to compression through application of force through said *projection means* [projections].

[5. An assembly as claimed in claim 1 wherein two projections are provided extending at right angles to one another at each of the corners at said other surface of each block.]

*6. An assembly as claimed in claim 1 wherein two of said projections are provided extending at right angles to one another at each of the corners of each block at said other surface thereof.*

References Cited

The following references, cited by the Examiner, are of record in the patented file of this patent or the original patent.

UNITED STATES PATENTS

| | | | |
|---|---|---|---|
| 517,576 | 3/1894 | Lee | 52—227 |
| 1,028,578 | 6/1912 | Lund | 52—227 |
| 1,214,442 | 1/1917 | Edlin | 52—227 |

FOREIGN PATENTS

| | | | |
|---|---|---|---|
| 116,346 | 6/1918 | Great Britain. | |
| 618,431 | 2/1949 | Great Britain | 52—436 |
| 682,619 | 5/1951 | Great Britain | 52—228 |
| 709,678 | 6/1954 | Great Britain | 52—227 |
| 713,211 | 11/1941 | Germany | 52—228 |
| 835,798 | 4/1952 | Germany | 52—228 |
| 212,826 | 3/1941 | Switzerland | 52—228 |

FRANK L. ABBOTT, Primary Examiner

J. L. RIDGILL, Jr., Assistant Examiner

U.S. Cl. X.R.

52—438, 602